US006320540B1

(12) United States Patent
Meredith

(10) Patent No.: US 6,320,540 B1
(45) Date of Patent: Nov. 20, 2001

(54) ESTABLISHING REMOTE BEAM FORMING REFERENCE LINE

(75) Inventor: Sheldon K. Meredith, Duvall, WA (US)

(73) Assignee: Metawave Communications Corporation, Redmond, WA (US)

(*) Notice: Subject to any disclaimer, the term of this patent is extended or adjusted under 35 U.S.C. 154(b) by 0 days.

(21) Appl. No.: 09/456,194

(22) Filed: Dec. 7, 1999

(51) Int. Cl.[7] ................................ H01Q 3/00; G01S 7/40

(52) U.S. Cl. ............................................ 342/377; 342/174

(58) Field of Search .................................... 342/383, 373, 342/174, 368, 377, 173

(56) References Cited

U.S. PATENT DOCUMENTS 4,532,518 * 7/1985 Gaglione et al. .................... 342/372
5,412,414 * 5/1995 Ast et al. ............................ 342/174
5,920,286 * 7/1999 Mohebbi ............................. 342/383

FOREIGN PATENT DOCUMENTS

WO 95/34103 * 12/1995 (WO) .

* cited by examiner

Primary Examiner—Gregory C. Issing
(74) *Attorney, Agent, or Firm*—Fulbright & Jaworski L.L.P.

(57) ABSTRACT

A system and method for establishing a beam forming phase reference line remote from an antenna system is taught. By providing a phase reference line at a selected position in the signal path the present invention allows for a beam forming matrix to be utilized in providing distributed amplification without requiring additional power sharing matrix arrangements. Moreover, disposing of the phase reference line at a selected point in the signal path according to the present invention allows for multi-mode communications wherein both switched beam and adaptive beam forming may be utilized.

48 Claims, 7 Drawing Sheets

ESTABLISHING REMOTE BEAM FORMING REFERENCE LINE

RELATED APPLICATIONS

The present application is related to commonly assigned U.S. patent application Ser. No. 09/092,429, now U.S. Pat. No. 6,133,868, entitled "System and Method for Fully Self-Contained Calibration of an Antenna Array," filed Jun. 5, 1998, the disclosure of which is incorporated herein by reference.

TECHNICAL FIELD

The present invention relates generally to wireless communication systems and more particularly to systems adapted to provide a beam forming reference line at a point in the signal path to allow flexibility in the synthesis of radiation patterns.

BACKGROUND

It is common in the art to utilize an antenna array comprised of a plurality of antenna elements in order to illuminate a selected area with a signal or signals. Often such an array is used in combination with beam forming techniques, such as phase shifting the signal associated with particular antenna elements of the array, such that the signals from the excited elements combine to form a desired beam, or radiation pattern, having a predetermined shape and/or direction.

For example beam forming matrices coupled to an antenna array, such as a phased array panel antenna, have been used in providing multiple antenna beams. One such solution utilizes a four by four Butler or hybrid matrix, having four inputs to accept radio frequency signals and four outputs each of which is coupled to an antenna element or column of elements of a panel phase array antenna, to provide four antenna beams, such as four 30° directional antenna beams. Each of the antenna beams of the above phased array is associated with a particular input of the beam forming matrix such that a signal appearing at a first input of the beam forming matrix will radiate in a first antenna beam by the input signal being provided to each of the four antenna elements coupled to the outputs of the beam forming matrix as signal components having a proper phase and/or power relation to one another. Likewise, a signal appearing at a second input of the beam forming matrix will radiate in a second antenna beam by the input signal being provided to each of the four antenna elements as signal components having a proper phase and/or power relation to one another which is different than the phase and/or power relation as between the signal components of the first beam. Accordingly, the beam forming matrix provides a spatial transform of the signal provided at a single input of the beam forming matrix.

Therefore, it is often desirable to provide signal input paths sufficient in number to result in the controllable excitation of the antenna columns as described above. For example, where twelve antenna beams are to be utilized, such as by deploying three four beam antenna arrays as described above in near proximity to result in 360° radiation of antenna beams, twelve signal input paths, each associated with a particular antenna beam, may be utilized.

In order to provide a signal of sufficient amplitude it is often desirable to provide amplification in each of the signals communicated. One method of providing such signal amplification uses a back to back hybrid matrix combination having sixteen linear power amplifiers (LPAs) disposed between a hybrid matrix and an inverse hybrid matrix to provide a distributed or load sharing amplifier suite, wherein the four inputs and outputs that do not correspond to an antenna beam are terminated. The advantage of this arrangement is that a hybrid matrix takes a signal input at any of the matrix's inputs and effectively provides a Fourier transform of the signal. This results in an input signal, provided to an input of the input hybrid matrix, appearing at each of the matrix's outputs as a linear phase progression (i.e., the input signal is dissected into components each appearing at a different hybrid matrix output). By amplifying each of these component signals, and applying the result to an inverse hybrid matrix, an amplified version of the original signal, including all of its components, may be had.

In order to transmit signals on a single beam of the four beam array using the beam forming network described above, the signal must be incident on only one of the four input ports of the beam forming network. This implies that the signals are transmitted out of one port of the above load sharing amplifier suite. However, in order to transmit the signal in any pattern other than the single beam from the beam forming matrix described above, i.e., beam syntheses, more than one input of the beam forming matrix must be driven. This implies that there are coherent signals present on more than one output of the load sharing amplifier suite and, accordingly, certain input ports of the load sharing amplifier inverse matrix must have complex vector summation.

Such complex vector summation at the input of the load sharing output matrix assures that the amplifiers driving the input ports of the load sharing output (inverse) matrix will contribute power unevenly to the antenna pattern which is generated. Generally, the greater the number of input ports of the beam forming matrix that are driven, the greater the degree of imbalance between amplifiers in the load sharing amplifier suite. Accordingly, the load is no longer distributed among the amplifiers of the load sharing amplifier suite when the system is utilized to radiate signals in patterns other than the single antenna beams defined by the beam forming matrix.

Signals, such as CDMA signals or signaling channels, may be provided in radiation patterns co-extensive with multiple ones of the antenna beams of such a system, such as when an omni directional beam is synthesized, requiring the driving of multiple, if not all, inputs of the beam forming matrix. This creates the worst possible power distribution among the amplifiers in the load sharing amplifier suite, as the above problems with unequal distribution of the signal across the amplifiers of the load sharing amplifier suite are experienced.

Moreover, CDMA signals have a high peak to average power ratio, causing such signals to be very demanding of linear power amplifier hardware for peak power handling. When multiple CDMA signals are transmitted through an amplifier, the problem is compounded due to increasing the peak to average ratio yet further. Accordingly, load sharing amplifier suites providing output power levels which are acceptable when such signals are evenly distributed among the amplifiers may overload particular amplifiers when signals are unbalanced as with the above described radiation pattern syntheses.

Although it is possible to avoid the use of such a load sharing amplifier suite, such as by providing a suite of LPAs in the signal paths prior to each input of the beam forming matrix, each such LPA of the suite would be associated with a particular antenna beam signal and, thus, would not provide load sharing. Accordingly, the failure of one such LPA would result in the failure of an antenna beam signal and, thus, would have a substantial affect on the radiation of signals. However, where a matrix arrangement is utilized to feed the amplifiers, if one or even a number of the LPAs malfunction it is still conceivable that performance may be had as signals are distributed among several amplifiers by the input matrix. Accordingly, if a few of the signal components are missing, such as due to failure of one or more of the LPAs, a beam may be formed fairly accurately.

Additionally, it might be possible to avoid the use of the aforementioned load sharing amplifier suite, such as by providing amplification of the signal components provided from the beam forming matrix, i.e., providing LPAs in signal paths directly coupled to each antenna element. However, LPAs are expensive and often cumbersome to implement. For example, they are relatively heavy and therefore often difficult to deploy in a typical antenna system environment. Similarly, the LPAs are active components consuming power and producing heat as a by-product and are susceptible to failure. Therefore, it is generally not desirable to dispose such LPAs in the environment in which the antenna elements and their associated beam forming matrix is disposed.

Therefore, a need exists in the art for a system and method by which various radiation patterns may be synthesized while providing a distributed amplifier arrangement such that signals of particular antenna beams may be provided with amplification via multiple amplifiers without overdriving such amplifiers when synthesizing a radiation pattern co-extensive with multiple ones of the antenna beams. Furthermore there is a need in the art for such systems and methods to allow the disposition of the amplifier suites utilized to be disposed in an environment suitable for their reliable use without causing undesired errors in signals to be combined.

SUMMARY OF THE INVENTION

These and other objects, features and technical advantages are achieved by a system and method which moves the signal phase reference plane from the drive point of the radiating elements of a multi-beam antenna to a position before a suite of amplifiers used in amplifying the signals. By moving the phase reference plane behind the amplifiers, the present invention allows a passive beam forming matrix, such as a Hybrid matrix, to be positioned at the phase reference plane allowing multiple channels to be independently switched to the desired antenna beam corresponding to the different beam forming matrix input ports without the need for adaptive antenna patterns to be individually created for each radio unit, i.e., radio transmitters and/or radio receivers, or channels at a base site. Accordingly, although being disposed at a point in the signal path remote from the antenna element, such as within the base station in the preferred embodiment, the present invention operates to provide a beam forming matrix between radio units and the amplifiers utilized for amplification of radio signals.

In order to compensate for phase differences, or other signal inconsistencies, to avoid undesired affects associated with differences in signal paths between the outputs of the beam forming matrix and the antenna elements associated therewith, the preferred embodiment utilizes a phase calibration technique which measures phase relationships at a point very near the antenna elements. Accordingly, time delays, phase shifters, and/or attenuators may be controlled to remediate any undesired affects associated with these differences in signal paths.

Moreover, as techniques for compensating for signal inconsistencies as provided to the antenna elements of an array are employed, a preferred embodiment of the present invention is able to reuse amplifiers present in a communication system which is retrofitted to operate according to the present invention. It should be appreciated that such reuse of amplifiers is typically not possible in distributed amplifier arrangements as formation of antenna beams relies upon establishing phase and amplitude relationships as among the signal components which are combined for transmission via an antenna beam and mismatching of amplifiers in a distributed amplifier suite may cause undesired phase and/or amplitude relationships. However, a preferred embodiment of the present invention utilizes the aforementioned signal inconsistency compensating techniques to remediate differences associated with reuse amplifiers not providing signal manipulation identical to other amplifiers in the suite.

It shall be appreciated that allowing the mixing of amplifiers may be utilized to provide economies in addition to those associated with the reuse of amplifiers described above. For example, where high power amplifiers are initially deployed in a system, such as a three sectored cellular communication system, retrofitted according to operate according to the present invention, the additional amplifiers in addition to the reuse amplifiers, the combination of which provide the above mentioned suite of amplifiers, may be lower power, and thus less expensive, amplifiers. Such an arrangement allows for the efficient utilization of the amplifiers as distributed amplification may be realized through the use of a suite, or portion of a suite, of amplifiers while higher power amplifiers (the reuse amplifiers) are available in the suite, coupled to selected antenna elements, which may be utilized for signals associated with wide antenna patterns, such as a CDMA or control channel signal.

A further advantage of the present invention is that with the inputs and outputs of the beam forming matrix being before the suite of power amplifiers, which in the preferred embodiment are disposed within the base station, it is possible to access both the narrow antenna beams associated with the beam forming matrix and the individual radiating elements of the antenna array. This provides the present invention with a dual-mode functionality with fixed-beam switching and fully adaptive array capability. Accordingly, a preferred embodiment of the present invention may provide the benefits of fixed-beam switching for one communication service, such as an analogue cellular communication service, and adaptive beam forming for another communication service, such as a digital personal communication service (PCS).

Additionally, as the elements of the antenna can be independently accessed, the antenna can be treated as a set of co-linear column radiators of arbitrary total width and height. Accordingly, access to the individual radiating elements of the antenna array according to the present invention allows for added functionality such as the ability of measuring direction of arrival of incoming signals such as for use in enhanced 911 (E911) services.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
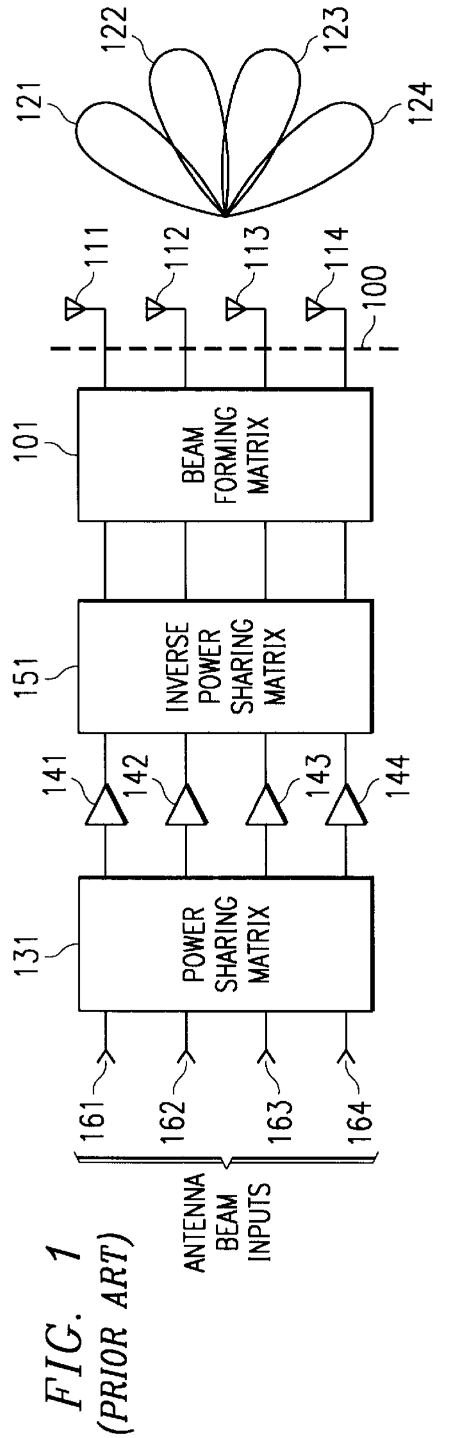
FIG. 1 (PRIOR ART)
FIG. 1 shows a prior art multi-beam system having a distributed amplifier arrangement coupled thereto.

In order to better understand the present invention, reference shall be made herein to a prior art arrangement for providing amplified signals within multiple antenna beams. Directing attention to FIG. 1, beam forming matrix 101, which may be a Hybrid matrix for example, is shown coupled to antenna elements 111, 112, 113, and 114 disposed for generating antenna beams 121, 122, 123, or 124 when each are provided a signal having a particular phase and amplitude relationship as between the antenna elements. Accordingly, a signal provided to a first input of beam forming matrix 101 may be divided into signal components, each having a particular phase relationship, which are present at the outputs of beam forming matrix 101 and, thus, excite antenna elements 111 through 114 to radiate the signal within antenna beam 121. Likewise, a signal provided to a second input of beam forming matrix 101 may be divided into signal components which are present at the outputs of beam forming matrix 101, having a different phase relationship than that of the signal associated with the first input, and excite antenna elements 111 through 114 to radiate the signal within antenna beam 122. The point in the signal path at which a controlled phase and amplitude relationship is provided in order to establish the desired antenna beams is shown schematically as phase reference base line 100.

It should be appreciated that the generally accepted technique for deploying such a beam forming matrix in the prior art is to deploy the matrix very near the antenna elements, although additional circuitry, such as radio units and signal amplifiers, are disposed remotely from the antenna elements, in order to provide the phase reference base line very near the antenna elements and avoid differences in these relationships associated with communication through additional lengths of signal path and/or components. For example, a phased array panel antenna deployed at the top of an outdoor mast of a base site may include antenna elements 111 through 114 and a feed network including beam forming matrix 101. Accordingly, the phase and/or amplitude relationships as provided by the beam forming matrix are preserved for radiation by the antenna elements as there is substantially no signal path there between.

In order to provide amplification of signals associated with the individual beams, a suite of amplifiers, here LPAs 141, 142,143, and 144, is provided in the signal paths. In order to provide distributed amplification of a particular antenna beam signal, power sharing matrix 131, which may be a hybrid matrix as described above with respect to the beam forming matrix, is coupled to antenna beam inputs 161, 162, 163, and 164 associated with antenna beams 121, 122,123, and 124 respectively. Accordingly, a signal input for radiation in a particular antenna beam is divided into signal components by power sharing matrix 131 where each signal component is provided amplification by a different amplifier of the amplifier suite. Thereafter, the amplified signal components are each provided to an inverse power sharing matrix 151, which may be an inverse hybrid matrix, and are recombined to form a single amplified antenna beam signal at a single output of inverse power sharing matrix 151 for coupling to a particular input of beam forming matrix 101 associated with the antenna beam in which the signal is to be radiated.

It should be appreciated from the above that a signal input at any one of inputs 161 results in a signal being radiated in a corresponding one of antenna beams 121 through 124. This is because the effects of power sharing matrix 131 and inverse power sharing matrix 151 cancel each other. Similarly, spatial combining associated with the radiation of the signal from antennas 111 through 114 cancels the effects of beam forming matrix 101. Accordingly, if it were not for the advantages of load sharing, each of the power sharing matrix and inverse power sharing matrices could be eliminated from the circuitry of FIG. 1 without adversely affecting the ability to radiate signals within a particular antenna beam. However, as spatial combining associated with the antenna array is unavoidable, beam forming matrix 101 cannot be eliminated from the signal path without adversely affecting the ability to radiate signals within a particular antenna beam.

Accordingly, the present invention eliminates the use of matrices specifically deployed for power sharing and instead relies upon the distribution of signal components as provided by a beam forming matrix and/or adaptive techniques in order to both provide signal distribution suitable for beam forming and for distributed amplification purposes. However, it should be appreciated that the amplifiers must be disposed on the antenna element side of the beam forming matrix in order to utilize a beam forming matrix to provide the distribution of signals for distributed amplification,. This is not generally acceptable in typical prior art deployments as phase and/or amplitude relationships as between the signal components may be affected by the signal paths and/or components disposed there between. Moreover, as active components such as the LPAs of an amplifier suite benefit from the protection of a controlled environment and are heavy, large consumers of power, etcetera, weighing toward their disposal remotely from the usual deployment of antenna elements, the LPAs, and therefore the beam forming matrix, of the present invention are not disposed co-located with the antenna elements. Instead, the beam forming matrix and amplifier suite of the present invention is deployed remotely from the antenna elements, such as within a radio shack of the base site.

In order to acceptably provide the antenna beams shown in FIG. 1, the system of the preferred embodiment of the present invention must effectively move the antenna inputs down the mast to the output of the beam forming matrix, i.e., move the phase reference base line. Directing attention to FIG. 2, circuitry adapted according to the present invention is shown wherein antenna elements 211, 212, 213, and 214 are all associated with all antenna beams 221, 222, 223, and 224. However, unlike the circuitry of FIG. 1, beam forming matrix 201 of FIG. 2 not only provides phase and/or amplitude relationships as among the antenna elements, but also provides distribution of signals for amplification by LPAs 241, 242, 243, and 244. Accordingly, an antenna beam signal provided at any one of inputs 261, 262, 263, or 264 will be distributed as signal components among each of amplifiers 241, 242, 243, and 244 and presented to each of antennas 211, 212, 213, and 214 as amplified signal components having a proper phase and/or amplitude relationship to result in the signal radiating within a corresponding antenna beam of antenna beams 221, 222, 223, and 224.

Figure 2:
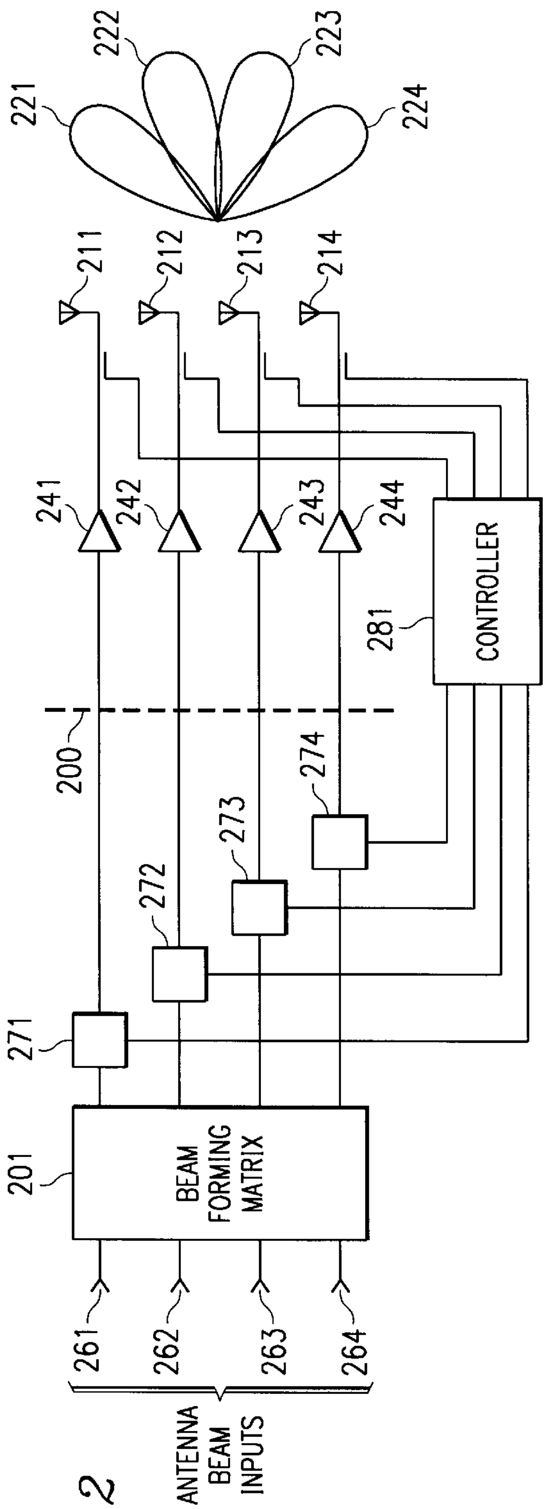
FIG. 2 shows a multi-beam system adapted according to the present invention.

The point in the signal path at which a controlled phase and amplitude relationship is provided in order to establish the desired antenna beams of FIG. 2 is shown schematically as phase reference base line 200. It shall be appreciated that at a minimum, the amplifier suite of FIG. 200 is disposed in the signal path between the phase reference base line and the antenna elements. Moreover, as antenna elements 211 through 214 are disposed at the top of an antenna mast associated with a base site in a preferred embodiment, the phase reference base line is disposed remotely from the antenna elements, i.e., there is an appreciable length of signal path, and therefore associated signal path differences, associated with the signals associated with each antenna element.

In order for the beam forming architecture to provide the desired antenna beams, the phase relationship of signals actually arriving at the input ports of the antenna elements must be known and controllable to within definable phase error limits. Accordingly manipulators 271, 272, 273, and 274 are disposed in the signal paths prior to the phase reference base line in order to provide signals at the phase reference base line having a variable phase and/or amplitude relationship adjusted to provide signals at the antenna elements with desired relative phase and/or amplitude relationships within acceptable limits.

It should be appreciated that not only may manipulators 271, 272, 273, and 274 be utilized to remediate the effects of differing length signal paths as among the signal components provided to the antenna elements, but may also provide remediation of signal component differences associated with mismatching of signal path components such as amplifiers of the amplifier suite. For example, where particular amplifiers are currently available which provide suitable amplification of signals for use in the amplifier suite, but are not numerous enough to populate the entire suite, these amplifiers may be utilized parallel to a number of additional, not necessarily matching, amplifiers to fully populate the amplifier suite. Although such mismatched amplifiers may have different characteristics, such as a different phase lag as between input and output signals, the present invention allows for their reuse by remediating these differences.

A preferred embodiment of the present invention includes controller 281 coupled to each of manipulators 271 through 274. Accordingly, this embodiment of the present invention is adapted to allow for dynamically changing conditions, such as thermal drift associated with amplifiers of the amplifier suite, affecting the phase relationships of the signal components as provided to the antenna elements. Preferably controller 281 utilizes feedback with respect to the signal attribute relationships of the various signal components in order to intelligently control manipulators 271 through 274. Preferably, in order to allow for the remediation of signal attribute relationship differences associated with as much of the signal paths as possible, measurement of such attributes are taken or otherwise monitored at a point in the signal paths as near the antenna elements as possible, as illustrated in FIG. 2.

A preferred embodiment of a controller adapted to provide signal attribute adjustment suitable for use according to the present invention is shown and described in detail in the above referenced patent application entitled "System and Method for Fully Self-Contained Calibration of an Antenna Array," previously incorporated herein by reference. Accordingly, the measuring of signal attribute relationship differences as between signal components and controlling of manipulators to remediate such differences will not be described in full detail herein.

It shall be appreciated that errors in the signal component attributes may be separated generally into two types of errors. The first type of error includes phase measurement and control accuracy errors. The second type of error includes non-measurable and noncontrollable errors.

Measurement accuracy errors are established by the signal to noise ratio in the signal attribute measurement device, its measurement granularity, any signal attribute errors in the calibration of the device, standing wave phenomena in the calibration loop, and the like. Control errors include the granularity of the manipulators, signal attribute errors in their calibration, drift in electrical paths between control intervals, and the like.

Non-measurable errors include those outside of the calibration loop which still contribute to degradation of the desired antenna pattern. For example length differences in the signal paths between the antenna elements and the couplers providing feed back to controller 281 would not be measurable. In a preferred embodiment, calibration signals arc injected into the desired signal paths. Therefore, similar to the non-measurable error associated with the signal paths between the couplers and antenna elements, phase errors on the desired signal before the injection point of the calibration signal would not be compensated by the calibration loop. In order to provide beam forming to desired levels of resolution, these errors are preferably either mechanically controlled in production of the system to a known tolerance or are measured and the errors stored for real-time offset to calibration loop measurements effected by the above described control system.

Phase errors can occur at other than the calibration frequency due to two other factors. The first factor is differential time delay due to cable length differences which produces linear phase errors. The second factor is frequency dispersive behavior through various devices which is sometimes a non-linear error function.

In a preferred embodiment, where the system of the present invention is deployed to provide cellular telephone wireless communication services, the components of the beam forming architecture should be able to handle approximately 21 MHZ of instantaneous bandwidth (this corresponds to the A-side cellular operator band). However, the preferred embodiment of the present invention does not provide for each channel having its own signal manipulator, i.e., multiple channels may be input at any one of inputs 261 through 264 of FIG. 2 for radiation in a selected antenna beam therefore resulting in each of manipulators 271 through 274 providing signal attribute manipulation for multiple channels. Optimally, the use of a single set of manipulators for each antenna port or each communication service is utilized as this minimizes the number of components and simplifies the implementation although driving the wide instantaneous bandwidth preference mentioned above.

Using the following equation to determine the differential path lengths between the remote baseline 200 and the inputs to the antenna ports, it can be seen that for a frequency delta of 10.5 MHZ (½ of 21 MHZ) and a phase velocity of 2.4E8 meters/second (the speed of light in coaxial cable) there is a 0.274 rad/meter phase shift.

$$\Delta\Phi(\text{rad})=2*\pi*\Delta\text{freq.(Hz)}*\Delta\text{length(m.)}/\text{phase velocity(m/sec)}$$

The 0.274 Rad/meter phase shift calculated above is equivalent to 15.75° per meter. Accordingly, substantially perfect calibration of the signal paths according to the present invention will allow drift of 15.75° at frequency differences of 10.5 MHZ from the calibration frequency. In a system where a maximum phase error of 20°, for example, is acceptable in producing the desired antenna patterns a drift of 15.75° could be tolerated. However, in order to maintain a high probability of synthesizing an acceptable antenna pattern, it can be readily appreciated that the signal attributes associated with signal path differences, such as time delays, should be compensated very carefully where a large bandwidth is desired according to a preferred embodiment of the present invention.

Having described concepts of the present invention generally above, a more detailed description will be given herein below with reference to a preferred embodiment of the present invention adapted to provide communication services in a multi-beam cellular system as shown in FIGS. 3 and 4. However, it shall be appreciated that the present invention is not limited to use with cellular communication systems and may in fact be utilized in any signal processing system where it is desired to manipulate multiple signals having a specific signal attribute relationship with respect to one another.

Figure 3A:
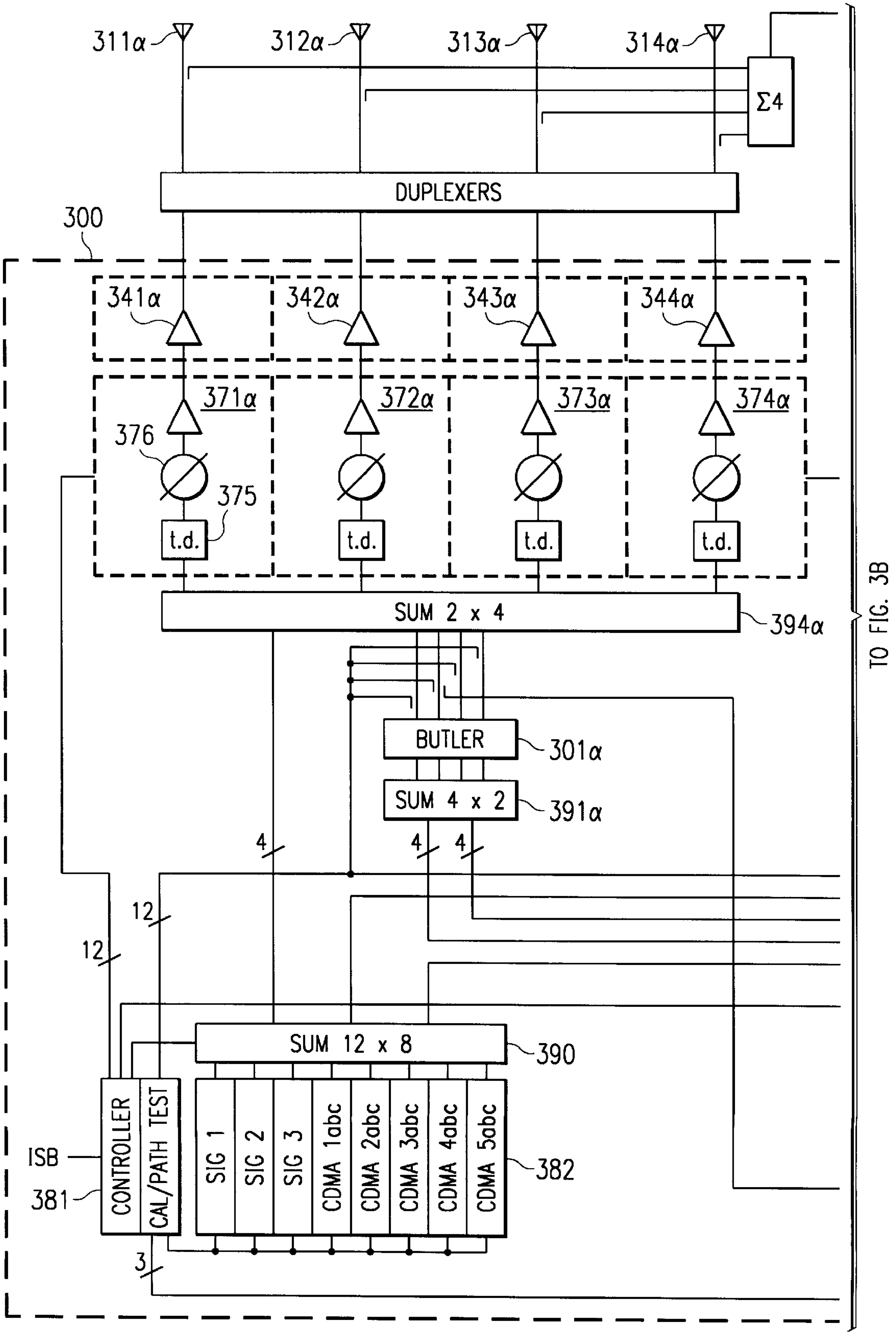
FIGS. 3A–3C show a dual mode transmission system of a preferred embodiment of the present invention.
Figure 3B:
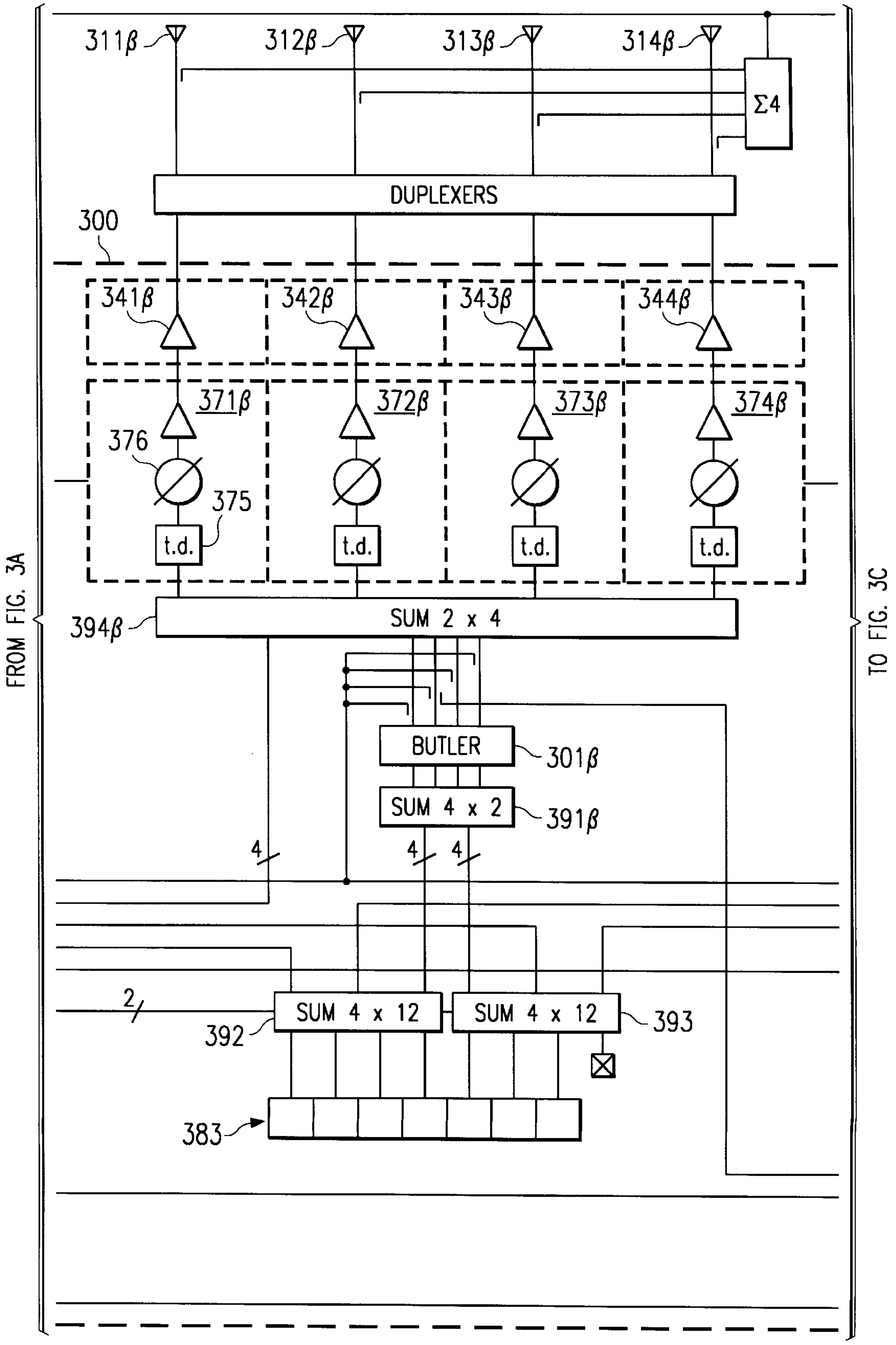
Figure 3C:
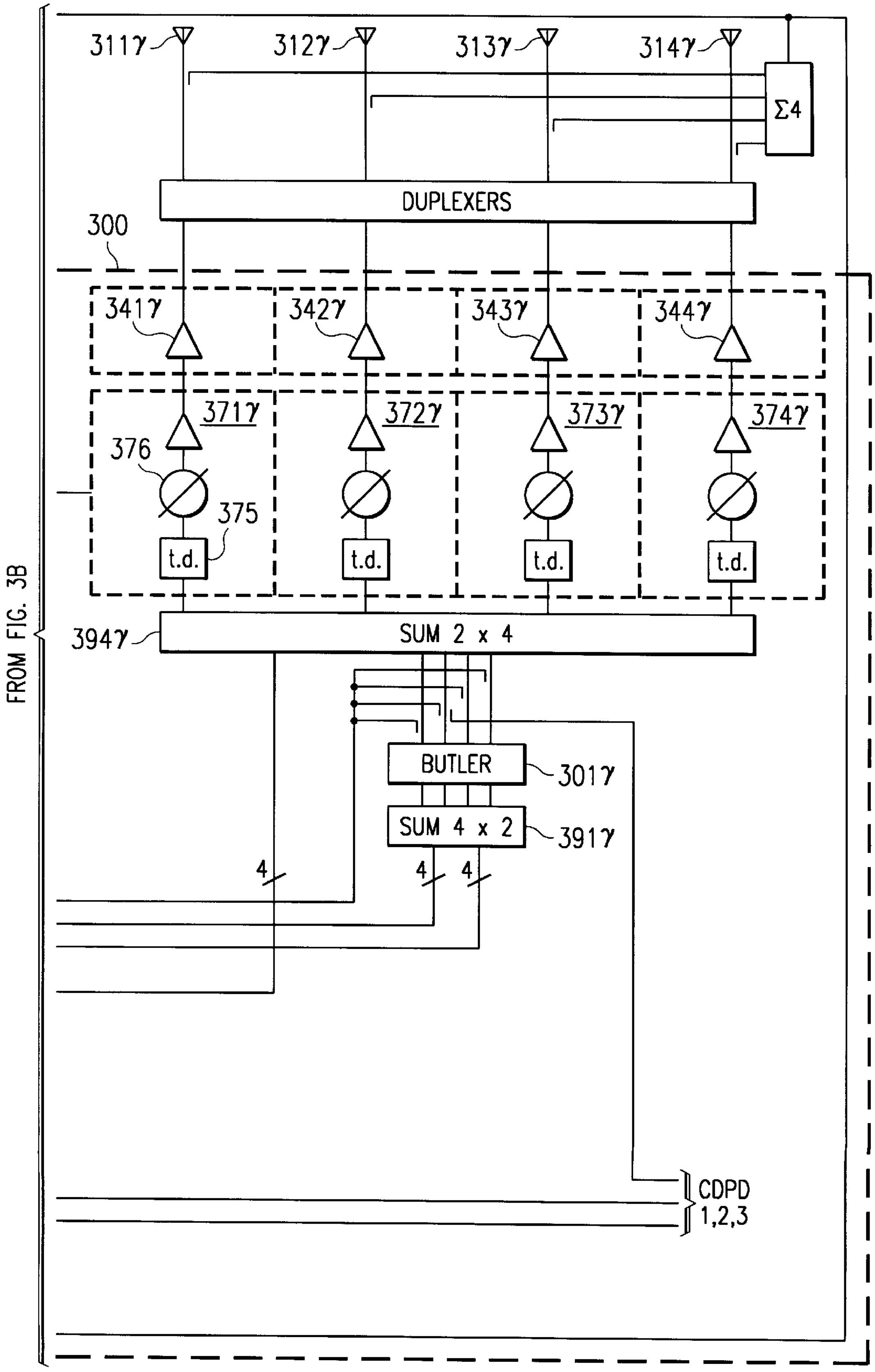

Directing attention to FIGS. 3A–3C, transmit circuitry adapted according to a preferred embodiment of the present invention is shown. Here base station 300 provides transmission of signals throughout an area irradiated by antennas 311α through 314α, 311β through 314β, and 311γ through 314γ, such as may be deployed at the top of a mast or rooftop disposed externally to base station 300. It shall be appreciated that the antennas of FIGS. 3A–3C may be utilized to provide multiple antenna beams as shown in FIG. 2. Accordingly, each of the α, β, and γ groupings may be disposed to provide substantially non-overlapping signal coverage, such as within an α, β, and γ sector of a base site. Of course, utilizing switching associated with the base site, signals are not limited to radiation within particular sectors of a cell and, therefore, the α, β, and γ nomenclature utilized herein is not intended to limit operation of the present invention to any particular sector mapping, fixed or otherwise.

The transmit circuitry of FIGS. 3A–3C is adapted for multi-mode transmissions. Accordingly, signals associated with multiple services are radiated by the antennas of this embodiment. In the particular embodiment illustrated, radios 382, preferably including radio units and adaptive beam forming circuitry such as phase shifting and amplitude adjusters, provide signals associated with a code division multiple access (CDMA) digital communication service and radios 383, preferably including radio units and beam switching circuitry such as switch matrices, provide signals associated with an analogue communication service. Of course there is no limitation to the use of the particular service signal types illustrated and, in fact, the present invention may operate with any number of services and/or signal formats including time division multiple access (TDMA) and frequency division multiple access (FDMA). Moreover, there is no limitation of the present invention to the transmission of signals associated with two services, and may in fact communicate any number of such signals, such as through the addition of signal summers and associated componentry.

The signals of radios 383 are coupled to beam forming matrices, specifically matrices 301α, 301β, and 301γ, in order to provide radiation of signals within predefined antenna beams through a Butler matrix as described above with reference to FIG. 2, although as will be appreciated from the discussion below the signal manipulators of the present invention may be utilized to provide adaptive beam forming with respect to these signals. In order to provide the ability of radiating any signal of radios 383 within any antenna beam, summers 392, 393, 391α, 391β, and 391γ are provided in the signal paths between radios 383 and beam forming matrices 301α, 301β, and 301γ. Accordingly the preferred embodiment allows for any radio signal from radios 383 to be radiated within any antenna beam of the system. Of course, where it is not desired to provide signal paths between all antenna beams and all radios, the circuitry of the system of FIGS. 3A–3C may be altered accordingly.

Preferably, summers 392 and 393 provide signal paths from all radio signals from radios 383 to each of summers 391α, 391β, and 391γ for coupling with each input of beam forming matrices 301α, 301β, and 301γ. Accordingly, in order to allow selection of a particular radio signal for radiation within a desired antenna beam, the preferred embodiment summers 391α, 391β, and 391γ incorporate switch matrix functionality controllable such as by controller 381. Of course, such switching capability may be disposed elsewhere in the signal path, such as within summers 391α, 391β, and 391γ, if desired.

It should be appreciated that the beam forming matrices of FIGS. 3A–3C are disposed within base station 300. Accordingly, the phase reference base line of the transmission system of FIGS. 3A–3C is not co-located with antennas 311α through 314α, 311β through 314β, and 311γ through 314γ but rather is located within base station 300. Accordingly, LPAs 341α through 344α, 341β through 344β, and 341γ through 344γ may be disposed in the signal paths between the beam forming matrices and the associated antennas to thereby provide distributed amplification without the need for additional matrices and inverse matrices.

In order to adjust for errors in the relative attributes of the signals as provided to the antennas, the system of FIGS. 3A–3C includes manipulators 371α through 374α, 371β through 374β, and 371γ through 374γ. Preferably each of manipulators 371α through 374α, 371β through 374β, and 371γ through 374γ include the ability to adjust signal time delays, i.e., adjust the signal to provide a particular cycle or cycles within a desired window, and the ability to adjust signal phase, i.e., to phase shift the signal to provide a phase adjustment of the particular cycle.

Accordingly, the preferred embodiment of the manipulators, such as manipulator 371α shown, include time delay 375 which provide signal propagation delay sufficient to allow adjustment of the signal passed there through to within a desired wavelength or small number of wavelengths. Likewise, the preferred embodiment of the manipulators, such as manipulator 371α shown, also includes phase shifter 376 which provides adjustment sufficient to allow phase shifting of the signals passed there through to a desired phase. Additionally, the manipulators may include additional circuitry such as low noise amplifiers, filters, and/or attenuators, if desired.

It shall be appreciated that the delays/phase adjustments of the manipulators of the present invention may be provided by any number of suitable devices. For example, predetermined lengths of transmission cable, surface acoustic wave (SAW) devices, digital signal processing (DSP), or the like may be utilized.

The signal manipulators may be fixed to provide a preselected amount of delay/phase shift, such as where the manipulators of the present invention are utilized to remediate the signal path differences of the signal components utilized in beam forming. For example, a system as illustrated in FIGS. 3A–3C may be deployed and the signal path differences from the phase reference base line to the antenna elements may be measured and remediated by proper selection or adjustment of ones of manipulators 371α through 374α, 371β through 374β, and 371γ through 374γ.

However, the preferred embodiment signal manipulators are dynamically adjustable, such as under control of controller 381. Accordingly, through sampling relative signal attributes of signal components utilized in beam forming, such as measuring relative phase differences at the antenna elements by controller 381, as described in the above referenced patent application entitled "System and Method for Fully Self-Contained Calibration of an Antenna Array," ones of manipulators 371α through 374α, 371β through 374β, and 371γ through 374γ may be dynamically adjusted to provide desired relative signal attributes at each of antennas 311α through 314α, 311β through 314β, and 311γ through 314γ. In order to allow for compensation of as nearly all the signal path as possible, the preferred embodiment samples signal attributes at a point in the signal path very near the antennas, as shown, and provides this information to controller 381. Preferably, in order to accurately detect any imbalances associated with the various signal paths, the preferred embodiment introduces a calibration signal at a point very near the outputs of the beam forming matrices, as shown. Accordingly, intelligence disposed in controller 381 may determine signal attribute differences at the antennas due to the different signal paths and/or components and adjust the signal manipulators accordingly to provide a desired signal attribute relationship, such as a desired phase progression between the antenna elements.

Such dynamic adjustment of the signal manipulators may be utilized to remediate dynamic signal path conditions, such as thermal drift associated with signal path components such as the amplifiers. Moreover, as will be discussed in further detail below, such dynamic adjustment of the signal manipulators may be utilized in adaptive beam forming in order to provide antenna beams of desired shapes or sizes and/or to provide antenna beam scanning.

It shall be appreciated that signal path differences so remediated may include differences associated with the use of mismatched LPAs in the distributed amplification of the signals. Accordingly, the present invention provides for the reuse of amplifiers such as may be available where a cellular base station is retrofitted to utilize the present invention.

As described above, the system of FIGS. 3A–3C is adapted for multi-mode transmissions. Accordingly, signal paths associated with multiple services are combined in the preferred embodiment, as illustrated by summers 394α, 394β, and 394γ, to be coupled to the antennas of this embodiment.

In the particular embodiment illustrated in FIGS. 3A–3C, radios 382 provide signals associated with a CDMA digital communication service and signaling channels. It shall be appreciated that the signals associated with radios 382 may advantageously be provided for transmission within radiation patterns serving a larger azimuth than the individual antenna beams associated with beam forming matrices 301α, 301β, and 301γ. Accordingly, the preferred embodiment provides controllable access to the individual radiating elements of the antenna array for the signals of radios 382 in order to allow for adaptive beam forming through controlling the signal manipulators according to any of a number of adaptive beam forming algorithms well known in the art. Therefore, the preferred embodiment disposes summers 394α, 394β, and 394γ in the signal path after beam forming matrices 301α, 301β, and 301γ.

In order to provide the ability of coupling any signal of radios 382 with any antenna, summer 390 is provided in the signal paths between radios 382 and antennas 311α through 314α, 311β through 314β, and 311γ through 314γ. Accordingly the preferred embodiment allows for any radio signal from radios 382 to be coupled to any antenna elements of the system.

Preferably, summer 390 provides signal paths for all radio signals from radios 382 to each of summers 394α, 394β, and 394γ for coupling with each input of antennas 311α through 314α, 311β through 314β, and 311γ through 314γ. Accordingly, in order to allow synthesis of a particular antenna pattern for any radio 382, the preferred embodiment incorporates signal manipulation functionality controllable such as by controller 381. Of course, such manipulation capability may be disposed elsewhere in the signal path, such as within summers 394α, 394β, and 394γ, if desired.

Accordingly, a desired radiation pattern may be synthesized by coupling a particular signal of radios 382 to particular ones of antennas elements 311α through 314α, 311β through 314β, and 311γ through 314γ. For example, where it is desired to synthesize an omni directional radiation pattern for a CDMA signal of radios 382, the signal may be coupled to a single elements of each antenna, i.e., elements 311α, 311β, and 311γ. Likewise, where it is desired to synthesize a sectored radiation pattern for a signaling channel of radios 382, the signal may be coupled to a single antenna element, i.e., antenna element 311α, or to multiple antennas, i.e., 311α and 312α with manipulators 371α and 372α providing a desired phase relationship there between to form a desired radiation pattern.

It shall be appreciated that adjustment of ones of the signal manipulators to provide a desired antenna pattern with respect to the signals of radios 382 may affect the antenna beams associated with the inputs of the beam forming matrices. However, in the preferred embodiment, where channels typically radiated within a large antenna pattern, such as the aforementioned CDMA and signaling channels, are provided by radios 382, these radios include adaptive circuitry, i.e., controllable phase shifters, to provide for fully adaptive beam forming of these signals. Accordingly, the adjustment of the signal manipulators of the present invention may be compensated for with respect to this communication mode signal by this adaptive circuitry. Moreover, where these adjustments are only minor or are maintained for relatively short periods of time, the affect upon the beams of the beam forming matrices may also generally be acceptable without such adaptive circuitry. Additionally, in an alternative embodiment signal manipulators for each service may be disposed in the discrete signal paths of radios 382 and 383, such as in the signal paths prior to summers 394α, 394β, and 394γ.

It shall be appreciated that the access to the individual antenna elements provided by the present invention does not require driving of multiple inputs of the beam forming matrix in order to provide signals, such as CDMA signals or signaling channels, in radiation patterns co-extensive with multiple ones of the antenna beams. Thus the aforementioned problems associated with power distribution among the amplifiers in the load sharing amplifier suite are avoided. Moreover, as the particular amplifier or amplifiers these signals are provided to is selectable, higher power amplifiers available in the suite of amplifiers may be selected for use by these signals. Furthermore, even if one such amplifier were to fail, alternative amplifiers in the suite may be selected to continue to provide a signal path, although possibly providing reduced power capabilities and/or other than ideal beam forming characteristics.

Although shown as transmit circuitry in FIGS. 3A–3C, the present invention may be utilized in the receive signal path as well. For example, duplexers may be coupled to antennas 311α through 314α, 311β through 314β, and 311γ through 314γ in order to couple transmit and receive circuitry adapted according to the present invention thereto.

Figure 4A:
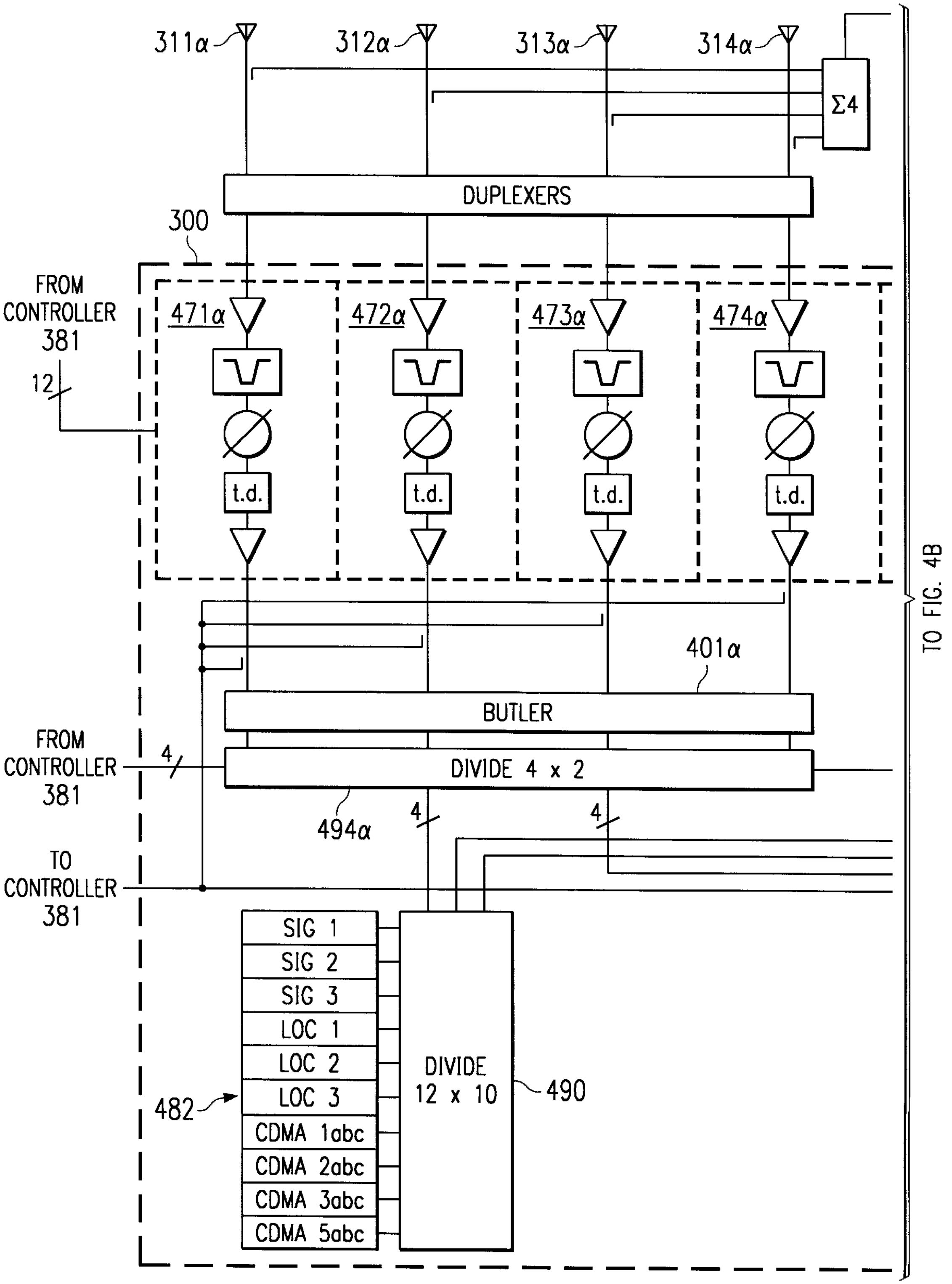
FIGS. 4A–4C show a dual mode reception system of a preferred embodiment of the present invention.
Figure 4B:
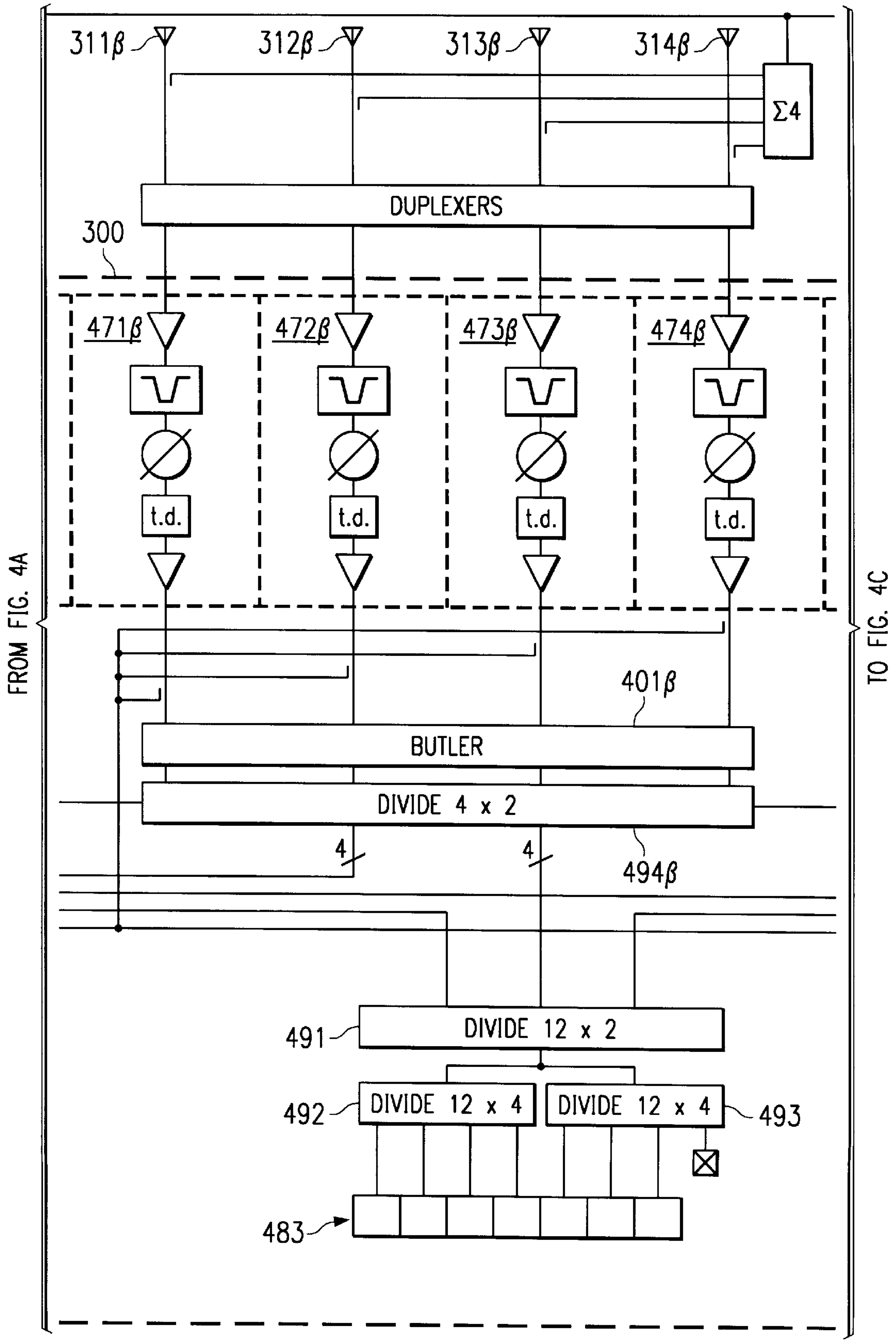
Figure 4C:
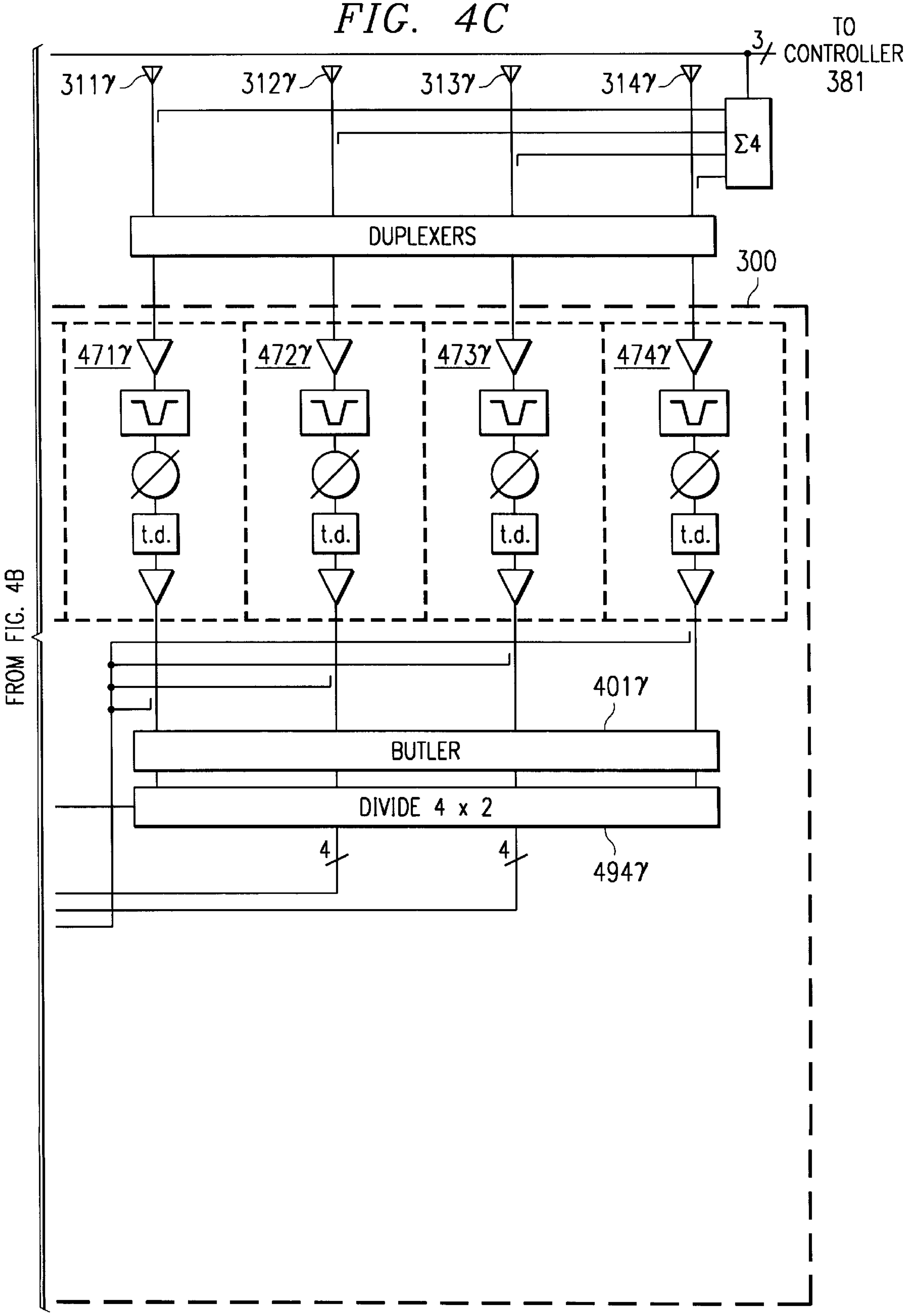

Directing attention to FIGS. 4A–4C, receive circuitry adapted according to a preferred embodiment of the present invention is shown. Here base station 300 provides communication of signals throughout an area viewed by antennas 311α through 314α, 311β through 314β, and 311γ through 314γ.

Like the transmit circuitry of FIGS. 3A–3C, the receive circuitry of FIGS. 4A–4C is adapted for multi-mode reception. Accordingly, signals associated with multiple services are received by the antennas and provided to radios associated with the particular services. In the particular embodiment illustrated, radios 482, which may be a receive portion of radios 382, receive signals associated with a CDMA digital communication service and radios 483, which may be a receive portion of radios 383, provide signals associated with an analogue communication service. Of course there is no limitation to the use of the particular service signal types illustrated and, in fact, the present invention may operate with any number of services and/or signal formats including TDMA and FDMA. Likewise, any number of services may be provided for.

The signals received by the antennas are coupled to beam forming matrices, specifically matrices 401α, 401β, and 401γ, in order to provide received signals as antenna beam signals to various inputs of radios 482 and 483, although it should be appreciated from the discussion above that the signal manipulators of the present invention may be utilized to provide adaptive beam forming with respect to these signals. In order to provide the ability of providing a signal received at any antenna or combination of antennas to any of radios 482 and 483, dividers 490, 491, 492, 493, 494α, 494β, and 494γ are provided in the signal paths between radios 482 and 483 and beam forming matrices 401α, 401β, and 401γ.

It shall be appreciated that the receive circuitry of FIGS. 4A–4C couples antenna beam signals associated with the outputs of beam forming matrices 40α, 401β, and 401γ to both radios 482 and 483. This may be where preferable beam synthesis utilizing combining multiple antenna beam signals is acceptable, as in the illustrated embodiment. However, in an alternative embodiment dividers 494α, 494β, and 494γ, may be disposed on the input (rather than the output as shown in FIGS. 4A–4C) side of the beam forming matrices in order to provide access to the antennas to the inputs of radios 482 as described above with respect to the outputs of radios 382. For example, where undesired nulls are present in a signal associated with combined antenna beams due to destructive combining, the signals provided to radios 483 may be divided from the common receive signal path at a point prior to the beam forming matrices in order to avoid this undesired destructive combining, if desired.

Preferably, the combination of dividers 492, 493, 491, 494α, 494β, and 494γ provide signal paths from all antenna beams to radios 483. Likewise, in order to provide the ability of coupling any antenna beam signal to radios 482, the combination of dividers 490, 494α, 494β, and 494γ are utilized in the signal paths between beam forming matrices 401α, 401β and 401γ and radios 482. Accordingly the preferred embodiment allows for any antenna beam signal, or any combination thereof, to be coupled to any input of radios 482. In order to allow selection or combination of any antenna beam or beams, CDMA signal manipulators 482 can amplitude adjust and combine any or all of the plurality of inputs from the Butler matrices and provide the composite signal or signals to associated radios.

It should be appreciated that the beam forming matrices of FIGS. 4A–4C are disposed within base station 300. Accordingly, the phase reference base line of the transmission system of FIGS. 4A–4C is not co-located with antennas 311α through 314α, 311β through 314β, and 311γ through 314γ but rather is located within base station 300 as were the beam forming matrices of FIGS. 3A–3C. Accordingly, in order to adjust for errors in the relative attributes of the signals as provided to the beam former inputs, the system of FIGS. 4A–4C includes manipulators 471α through 474α, 471β through 474β, and 471γ through 474γ.

As with the manipulators of FIGS. 3A–3C, preferably each of manipulators 471α through 474α, 471β through 474β, and 471γ through 474γ include the ability to adjust signal time delays, i.e., adjust the signal to provide a particular cycle or cycles within a desired window, and the ability to adjust signal phase, i.e., to phase shift the signal to provide a phase adjustment within the particular cycle or cycles. Accordingly, the preferred embodiment of the manipulators include a time delay and a phase shifter. Additionally, the manipulators may include additional circuitry such as low noise amplifiers, filters, and/or attenuators, if desired.

It shall be appreciated that the delays/phase adjustments of the manipulators of the present invention may be provided by any number of suitable devices. For example, predetermined lengths of transmission cable, surface acoustic wave (SAW) devices, digital signal processing (DSP), or the like.

The signal manipulators may be fixed to provide a preselected amount of delay/phase shift, such as where the manipulators of the present invention are utilized to remediate the signal path differences of the signal components utilized in beam forming. For example, a system as illustrated in FIGS. 4A–4C may be deployed and the signal path differences from the phase reference base line to the antenna elements may be measured and remediated by proper selection or adjustment of ones of manipulators 471α through 474α, 471β through 474β, and 471γ through 474γ.

However, the preferred embodiment signal manipulators are dynamically adjustable, such as under control of controller 381. Accordingly, through sampling relative signal attributes of signal components utilized in beam forming, such as measuring relative phase differences at the inputs to the beam forming matrices by controller 381, ones of manipulators 471α through 474α, 471β through 474β, and 471γ through 474γ may be dynamically adjusted to provide desired relative signal attributes at the inputs of beam forming matrices 401α, 401β, and 401γ. In order to allow for compensation of as nearly all the signal path as possible, the preferred embodiment samples signal attributes at a point in the signal path very near the beam forming matrix inputs, as shown, and provides this information to controller 381. Preferably, in order to accurately detect any signal attribute differences associated with the different signal paths and/or components, the preferred embodiment introduces a calibration signal at a point very near the antennas, as shown.

Accordingly, intelligence disposed in controller 381 may determine signal attribute relationships at various points in the signal path and adjust the signal manipulators accordingly to provide a desired signal attribute relationship, such as a desired phase progression at the inputs of the beam forming matrices.

Although the preferred embodiment shown disposes the beam forming matrices utilized in the receive signal path within the base station, it shall be appreciated that the beam forming matrices for this signal path may be disposed more near the antennas if desired. For example, as distributed amplification is not utilized in this preferred embodiment, there is no need to dispose LPAs in the receive signal path prior to the beam forming matrices. Accordingly, it may be desirable to dispose the beam forming matrices up mast immediately following the duplexers in the circuitry. Such an arrangement does not require disposing LPAs in an environment, i.e., up mast, typically not suited for their continued and reliable operation.

Although the duplexers are shown in FIGS. 3 and 4 to be disposed external to base station 300, such as up mast with the corresponding antennas, an alternative embodiment may dispose these system components within the base station. Accordingly, only passive elements may be required to be disposed in the harsh environment associated with the placement of the antenna elements.

Although described with reference to a panel array of antenna elements utilized to form antenna beams, there is no such limitation to the present invention. It is anticipated that the present invention may be utilized with any number of antenna configurations adapted or adaptable to form antenna beams. For example, the present invention may be utilized with a conical antenna system or with a single antenna providing multiple beams associated with various inputs.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system providing phase reference line at a point in a signal path remote from an antenna utilized in forming desired antenna patterns, said system comprising:

a plurality of signal manipulators, each signal manipulator of said plurality disposed in a signal path coupled to said antenna, wherein a point of said signal path each of said signal manipulators is disposed is between said antenna and circuitry adapted to define said desired antenna patterns;

a controller coupled to said plurality of signal manipulators adapted to provide control signals thereto to selectively manipulate signal attributes of signals communicated through said signal paths to provide a beam forming phase reference line at said point of said signal path said signal manipulators are disposed; and a signal attribute monitoring circuit, wherein signal attributes which may be manipulated by said signal manipulators under control of said controller are monitored for intelligent control of said signal manipulators by said controller, wherein said signal attribute monitoring circuit comprises a first coupler introducing a calibration signal into each said signal path and a second coupler receiving said calibration signal introduced into each said signal path.

2. The system of claim 1, wherein said plurality of signal manipulators comprise:

circuitry adapted to provide a cycle of a communicated signal having a desired phase relationship.

3. The system of claim 2, wherein said plurality of signal manipulators further comprise:

circuitry adapted to provide said cycle of said communicated signal to within a wavelength of said desired phase relationship.

4. The system of claim 1, wherein said plurality of signal manipulators comprise:

circuitry adapted to provide a desired amplitude of a communicated signal.

5. The system of claim 1, wherein said plurality of signal manipulators comprise:

circuitry adapted to filter undesired frequencies from a communicated signal.

6. The system of claim 1, wherein said circuitry adapted to define said desired antenna patterns includes a beam forming matrix.

7. The system of claim 6, wherein said circuitry adapted to define said desired antenna patterns includes a plurality of beam forming matrices.

8. The system of claim 6, wherein said beam forming matrix includes a plurality of inputs each associated with a particular antenna pattern of said desired antenna patterns and a plurality of outputs each coupled to a signal manipulator of said plurality of signal manipulators.

9. The system of claim 8, further comprising:

signal amplification circuitry disposed in the signal path between each said output of said plurality of outputs and said antenna.

10. The system of claim 9, wherein signal amplification circuitry affects signal attributes differently with respect to a signal communicated between a first output of said plurality of outputs and said antenna than a signal communicated between a second output of said plurality of outputs and said antenna, and wherein said controller provides a control signal to a first signal manipulator of said plurality of manipulators in response to information from said signal attribute monitoring circuit in order to remediate said different signal attribute.

11. The system of claim 9, wherein said signal amplification circuitry provides higher power amplifiers in particular signal paths coupled to said antenna and lower power amplifiers in other signal paths coupled to said antennas.

12. The system of claim 11, further comprising:

circuitry for selecting a higher power amplifier of said signal amplification circuitry for use with signals to be radiated in a radiation pattern co-extensive with multiple ones of the desired antenna patterns.

13. The system of claim 8, further comprising:

signal combining circuitry disposed in the signal path between each said output of said plurality of outputs and a corresponding signal manipulator of said plurality of signal manipulators, wherein said signal combining circuitry is coupled to signals not communicated through said beam forming matrix to thereby establish a multiple mode communication system.

14. The system of claim 13, wherein a first mode of said multiple mode communication system switchably utilizes ones of said antenna patterns defined by said beam forming matrix and a second mode of said multiple mode communication system utilizes antenna patterns co-extensive with multiple ones of said antenna patterns defined by said beam forming matrix.

15. The system of claim 13, wherein a first mode of said multiple mode communication system is associated with a first communication service and a second mode of said multiple mode communication system is associated with a second communication service.

16. The system of claim 15, wherein said first communication service is an analogue communication service and said second communication service is a digital communication service.

17. The system of claim 1, wherein said first coupler introduces said calibration signal into each said signal path at a point near said circuitry adapted to define ones of said plurality of antenna patterns and said second coupler receives said calibration signal at a point in each said signal path near said antenna.

18. The system of claim 1, wherein said first coupler introduces said calibration signal into each said signal path at a point in each said signal path near said antenna and said second coupler receives said calibration signal at a point near said circuitry adapted to define ones of said plurality of antenna patterns.

19. The system of claim 1, wherein monitoring of said signal attributes is accomplished at least in part through a relationship of said calibration signal as introduced in a signal path with said calibration signal as received from said signal path.

20. A method for providing a beam forming phase reference line at a point in a signal path remote from a plurality of antennas utilized in forming a plurality of antenna beams, said method comprising the steps of:

providing a plurality of signal paths wherein each signal path of said plurality of signal paths is associated with one of said plurality of antennas;

disposing a plurality of signal manipulators in said plurality of signal paths, wherein a point of said signal path each of said signal manipulators is disposed is between said associated antenna and circuitry adapted to define ones of said plurality of antenna beams;

coupling a controller to each signal manipulator of said plurality of signal manipulators;

coupling a signal attribute monitoring circuit to said controller and to each signal path of said plurality of signal paths;

monitoring signal attributes of signals communicated by ones of said plurality of signal paths, wherein monitoring said signal attributes comprises:

introducing a calibration signal into ones of said signal paths; and receiving said calibration signal introduced into said signal paths at a point in said signal paths remote from the introduction of said calibration signal; and manipulating signal attributes of selected ones of said signals communicated by ones of said plurality of signal paths under control of control signals provided by said controller to provide a beam forming phase reference line at said point of said signal path said signal manipulators are disposed.

21. The method of claim 20, wherein said manipulating step comprises the step of:

providing a cycle of a communicated signal with a desired phase relationship.

22. The method of claims 21, wherein said manipulating step further comprises the step of:

providing said cycle of said communicated signal to within a wavelength of said desired phase relationship.

23. The method of claim 20, wherein said circuitry adapted to define ones of said plurality of antenna beams includes a beam forming matrix.

24. The method of claim 23, wherein said beam forming matrix includes a plurality of inputs each associated with a particular antenna beam of said plurality of antenna beams and a plurality of outputs each coupled to a signal manipulator of said plurality of signal manipulators.

25. The method of claim 24, further comprising the steps of:

disposing a plurality of amplifiers in a plurality of said signal paths at a point of said signal path between said signal manipulators and said a corresponding one of said antennas; and amplifying signals communicated through ones of the signal paths.

26. The method of claim 24, further comprising the steps of:

disposing signal combining circuitry in the signal path between each said output of said plurality of outputs and a corresponding signal manipulator of said plurality of signal manipulators; and coupling said signal combining circuitry to signals not communicated through said beam forming matrix to thereby establish a multiple mode communication system.

27. The method of claim 26, wherein a first mode of said multiple mode communication system is associated with a first communication service and a second mode of said multiple mode communication system is associated with a second communication service.

28. The method of claim 25, wherein said amplification step affects signal attributes differently with respect to a signal communicated in a signal path associated with a first signal manipulator of said plurality of signal manipulators than a signal communicated in a signal path associated with a second signal manipulator of said plurality of signal manipulators, and wherein said manipulating step remediates said difference in signal attributes.

29. The method of claim 25, wherein said signal amplification circuitry provides higher power amplifiers in particular signal paths coupled to said antenna and lower power amplifiers in other signal paths coupled to said antennas.

30. The system of claim 29, further comprising:

selecting a higher power amplifier of said signal amplification circuitry for use with signals to be radiated in a radiation pattern co-extensive with multiple ones of the desired antenna patterns.

31. A system comprising:

an antenna having a plurality of antenna interfaces to provide communication of signals provided thereto within multiple antenna beams;

a beam forming matrix having a plurality of matrix interfaces coupled to said plurality of antenna interfaces;

means for adjusting a phase of signals communicated between said beam forming matrix and said antenna, wherein said phase adjusting means provides independent phase adjustment of signals provided between ones of said plurality of matrix interfaces and corresponding ones of said antenna interfaces;

means for dynamically controlling said phase adjusting means comprising;

means for monitoring signal attributes of signals communicated between said beam forming matrix and said antenna; and means for determining a phase adjustment amount at said phase adjusting means suitable for providing a desired phase relationship at said signal attribute monitoring means; and means for combining signals which are not communicated through said beam forming matrix with signals which are communicated through said beam forming matrix, wherein said combining means is disposed in signal paths between ones of said plurality of matrix interfaces and corresponding ones of said antenna interfaces.

32. The system of claim 31, further comprising:

means for amplifying signals communicated bet ween said beam forming matrix and said antenna.

33. The system of claim 32, wherein said amplifying means comprises:

a suite of amplifiers, wherein amplifiers of said suite of amplifiers are not matched to other amplifiers of said suite of amplifiers, and wherein said manipulating means remediates said amplifier mismatches.

34. The system of claim 31, wherein said manipulating step comprises:

means for providing a time delay; and means for providing a phase shift.

35. The system of claim 31, wherein said signals which are not communicated through said beam forming matrix are associated with a first communication service and said signals which are communicated through said beam forming matrix are associated with a second communication service.

36. The system of claim 31, wherein said beam forming matrix includes at least one Butler matrix.

37. A multiple mode communication system adapted to provide both predefined antenna beams and antenna patterns independent of said predefined antenna beams, said system comprising:

an antenna array having a plurality of antenna interfaces;

a first signal source providing first signals to be radiated in said antenna patterns;

a second signal source providing second signals to be radiated in said antenna beams;

a first beam forming matrix having a plurality of inputs associated with said predefined antenna beams coupled to said second signal source and having a plurality of outputs coupled to corresponding antenna interfaces of said plurality of antenna interfaces thereby providing a first plurality of signal paths between said plurality of outputs and said plurality of antenna interfaces;

a signal combiner apparatus coupled to said first signal source and to said plurality of outputs;

first phase adjustment apparatus disposed in said first plurality of signal paths adapted to provide independent phase adjustment of combined signals communicated through ones of said first plurality of signal paths; and signal amplitude adjustment apparatus disposed in said first plurality of signal paths adapted to provide independent amplitude adjustment of combined signals communicated through ones of said first plurality of signal paths.

38. The system of claim 37, further comprising:

a controller coupled to said phase adjustment apparatus and to ones of said first plurality of signal paths, wherein said controller monitors a phase relationship of signals communicated through said ones of said first plurality of signal paths and controls said phase adjustment apparatus to provide a desired monitored phase relationship.

39. The system of claim 38, wherein said controller is coupled to said ones of said first plurality of signal paths in at least two places each.

40. The system of claim 39, wherein a first said place said controller is coupled is at a point in said ones of said first plurality of signal paths near said outputs of said beam forming matrix and a second said place said controller is coupled is at a point in said ones of said first plurality of signal paths near said antenna interfaces.

41. The system of claim 37, further comprising:

a first signal receiver accepting first signals associated with said antenna patterns;

a second signal receiver accepting second signals associated with said antenna beams;

a first beam forming matrix having a plurality of inputs associated with said predefined antenna beams coupled to said second signal source and having a plurality of outputs coupled to corresponding antenna interfaces of said plurality of antenna interfaces thereby providing a first plurality of signal paths between said plurality of outputs and said plurality of antenna interfaces;

a second beam forming matrix having a plurality of outputs associated with said predefined antenna beams coupled to said second signal receiver and having a plurality of inputs coupled to corresponding antenna interfaces of said plurality of antenna interfaces thereby providing a second plurality of signal paths between said plurality of inputs and said plurality of antenna interfaces;

second phase adjustment apparatus disposed in said second plurality of signal paths adapted to provide independent phase adjustment of signals communicated through ones of said second plurality of signal paths;

a signal divider apparatus coupled to said plurality of outputs associated with said predefined antenna beams and to said first signal receiver; and duplexer circuitry disposed in said first and second plurality of signal paths adapted to couple said plurality of interfaces of said antenna array to said first signal source and said second signal source and said first signal receiver and said second receiver.

42. A system providing phase reference line at a point in a signal path remote from an antenna utilized in forming desired antenna patterns, said system comprising:

a plurality of signal manipulators, each signal manipulator of said plurality disposed in a signal path coupled to said antenna, wherein a point of said signal path each of said signal manipulators is disposed is between said antenna and circuitry adapted to define said desired antenna patterns;

a controller coupled to said plurality of signal manipulators adapted to provide control signals thereto to selectively manipulate signal attributes of signals communicated through said signal paths to provide a beam forming phase reference line at said point of said signal path said signal manipulators are disposed;

a signal attribute monitoring circuit, wherein signal attributes which may be manipulated by said signal manipulators under control of said controller are monitored for intelligent control of said signal manipulators by said controller; and signal combining circuitry disposed in the signal path between each output of a plurality of outputs of said circuitry adapted to define said desired antenna patterns and a corresponding signal manipulator of said plurality of signal manipulators, wherein said signal combining circuitry is coupled to signals not communicated through said circuitry adapted to define said desired antenna patterns to thereby establish a multiple mode communication system.

43. The system of claim 42, wherein a first mode of said multiple mode communication system is associated with a first communication service and a second mode of said multiple mode communication system is associated with a second communication service.

44. The system of claim 43, wherein said first communication service is an analogue communication service and said second communication service is a digital communication service.

45. The system of claim 42, wherein a first mode of said multiple mode communication system switchably utilizes ones of said antenna patterns defined by said circuitry adapted to define said desired antenna patterns and a second mode of said multiple mode communication system utilizes antenna patterns co-extensive with multiple ones of said antenna patterns defined by said circuitry adapted to define said desired antenna patterns.

46. A method for providing a beam forming phase reference line at a point in a signal path remote from a plurality of antennas utilized in forming a plurality of antenna beams, said method comprising the steps of:

providing a plurality of signal paths each associated with one of said plurality of antennas;

disposing a plurality of signal manipulators in said plurality of signal paths, wherein a point of said signal path each of said signal manipulators is disposed is between said associated antenna and circuitry adapted to define ones of said plurality of antenna beams;

coupling a controller to each said plurality of signal manipulators;

coupling a signal attribute monitoring circuit to said controller and to each signal path of said plurality of signal paths;

monitoring signal attributes of signals communicated by ones of said plurality of signal paths;

manipulating signal attributes of selected ones of said signals communicated by ones of said plurality of signal paths under control of control signals provided by said controller to provide a beam forming phase reference line at said point of said signal path said signal manipulators are disposed;

disposing signal combining circuitry in the signal path between each output of a plurality of outputs of said circuitry adapted to define ones of said plurality of antenna beams and a corresponding signal manipulator of said plurality of signal manipulators; and coupling said signal combining circuitry to signals not communicated through said circuitry adapted to define ones of said plurality of antenna beams to thereby establish a multiple mode communication system.

47. The method of claim 46, wherein a first mode of said multiple mode communication system is associated with a first communication service and a second mode of said multiple mode communication system is associated with a second communication service.

48. A method for providing a beam forming phase reference line at a point in a signal path remote from a plurality of antennas utilized in forming a plurality of antenna beams, said method comprising the steps of:

providing a plurality of signal paths, wherein each signal path of said plurality of signal paths is associated with one of said plurality of antennas;

disposing a plurality of signal manipulators in said plurality of signal paths, wherein a point of said signal path each of said signal manipulators is disposed is between said associated antenna and circuitry adapted to define ones of said plurality of antenna beams, wherein said circuitry adapted to define ones of said plurality of antenna beams includes a beam forming matrix, and wherein said beam forming matrix includes a plurality of inputs each associated with a particular antenna beam of said plurality of antenna beams and a plurality of outputs each coupled to a signal manipulator of said plurality of signal manipulators;

coupling a controller to each signal manipulator of said plurality of signal manipulators;

coupling a signal attribute monitoring circuit to said controller and to each signal path of said plurality of signal paths;

monitoring signal attributes of signals communicated by ones of said plurality of signal paths;

manipulating signal attributes of selected ones of said signals communicated by ones of said plurality of signal paths under control of control signals provided by said controller to provide a beam forming phase reference line at said point of said signal path said signal manipulators are disposed;

disposing a plurality of amplifiers in a plurality of said signal paths at a point of said signal path between said signal manipulators and said a corresponding one of said antennas, wherein said signal amplification circuitry provides higher power amplifiers in particular signal paths coupled to said antenna and lower power amplifiers in other signal paths coupled to said antennas;

amplifying signals communicated through ones of the signal paths; and selecting a higher power amplifier of said signal amplification circuitry for use with signals to be radiated in a radiation pattern co-extensive with multiple ones of the desired antenna patterns.

* * * * *